July 19, 1927.
J. A. PINAUD
1,636,434
WIND MOTOR
Filed Jan. 25, 1923 2 Sheets-Sheet 2
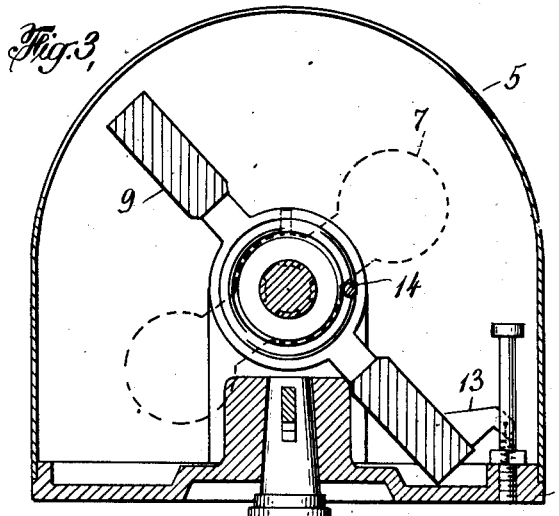
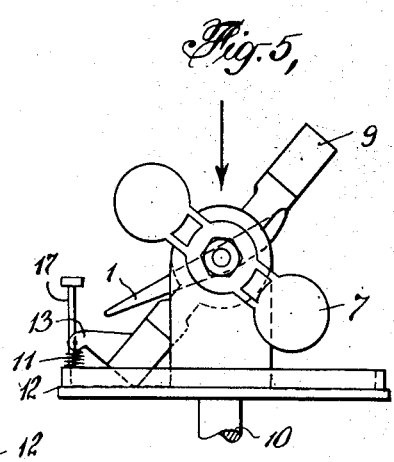
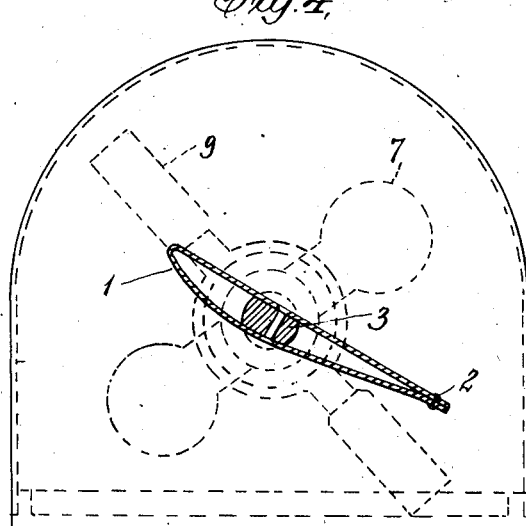
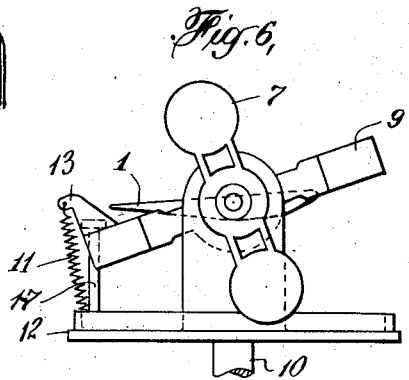
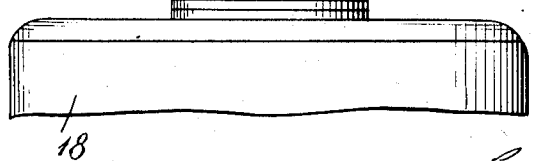
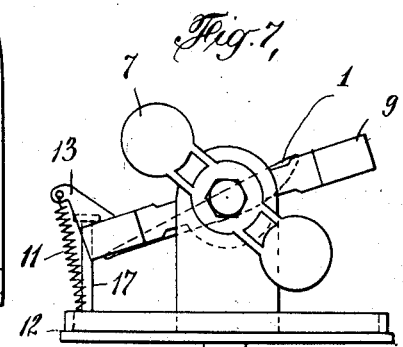
INVENTOR
John A. Pinaud
BY
ATTORNEY Patented July 19, 1927.

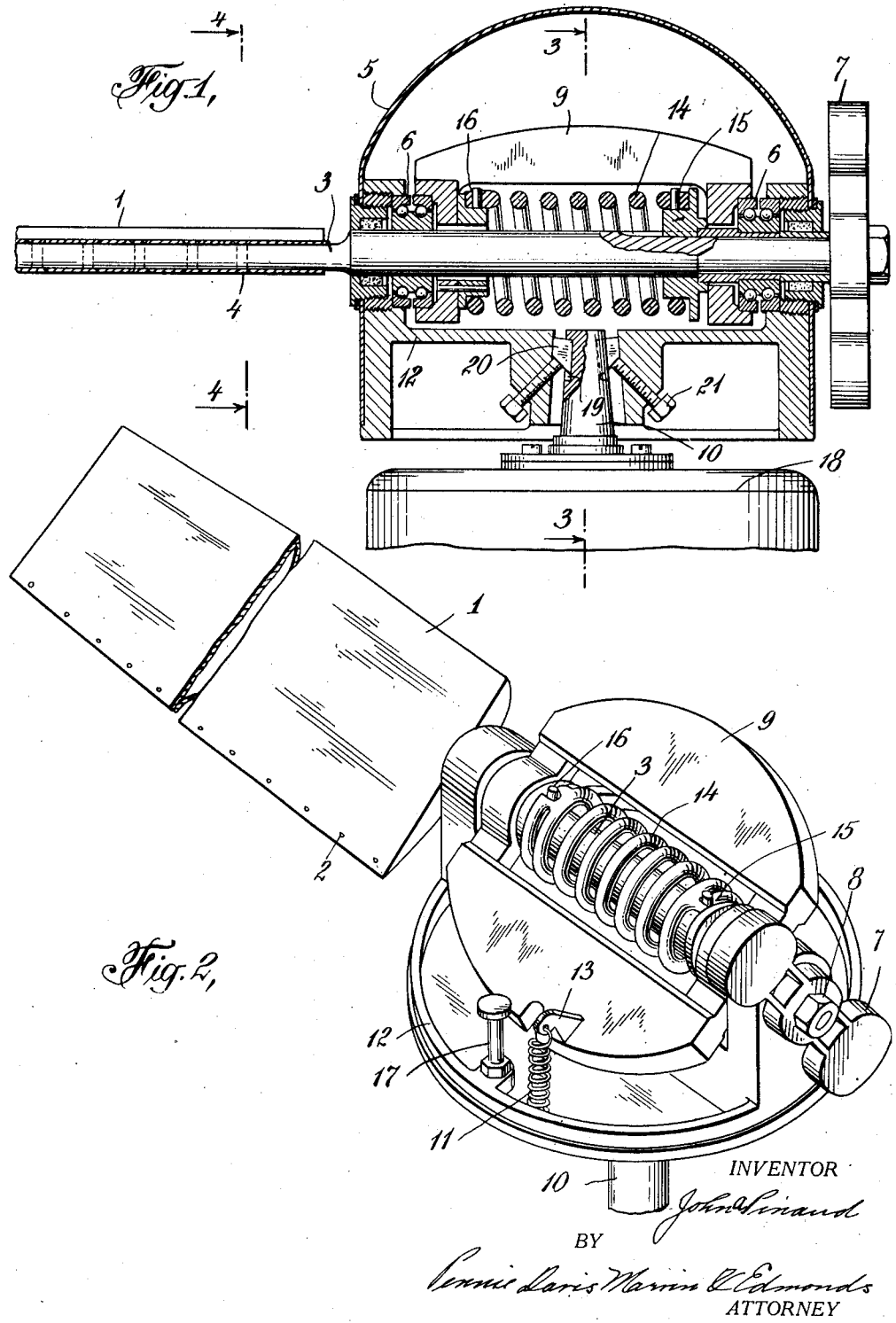

1,636,434

UNITED STATES PATENT OFFICE.

JOHN ARCHIBALD PINAUD, OF ATLANTIC HIGHLANDS, NEW JERSEY.

WIND MOTOR.

Application filed January 25, 1923. Serial No. 615,458.

This invention relates to wind motors of the type adapted to rotate at comparatively high speed, and particularly adapted to drive electric generators for charging storage batteries, and for other similar purposes. In general this type of wind motor may be used for any purpose not requiring a high degree of speed control, and which is capable of utilizing power developed by the motor when operating at a limited range of speed.

It is well known that a motor having a blade which at all times is inclined to the wind at an angle which gives maximum efficiency at full speed, must either be started by auxiliary means, or must be given considerable wind to start, due to the fact that when the motor is starting, the angle with the wind is too great to enable the motor to operate efficiently. With such a motor it is not possible to utilize in an economical manner winds of comparatively low velocity, due to the fact that the motor does not operate properly at low velocities.

The principal object of this invention is to provide a wind motor having a single rotating blade, and of such a character that this blade is held at an angle which makes the motor operate at maximum efficiency at all speeds. The improved motor is provided with means which hold the blade at a comparatively small angle to the wind when the motor is starting. This means is of a yielding nature so that as the speed of the motor increases, this angle with the wind gradually increases until the motor is operating at full speed. The blade is therefore inclined at the proper angle to provide efficient operation of the motor at all speeds.

It is, therefore, apparent that the present invention comprises a motor of such a character that the blade is always inclined at the most efficient angle regardless of the speed of the motor and the velocity of the wind.

Further objects and advantages of the present invention will be apparent upon considering the following detailed description which is to be read in conjunction with the accompanying drawings, in which Fig. 1 shows a longitudinal section of the improved motor;

Fig. 2 is a perspective view of the improved motor;

Fig. 3 is a transverse section of the motor showing the details of construction;

Fig. 4 is a transverse section taken through the blade of the motor showing the construction of the blade; and Figs. 5, 6 and 7 are diagrammatic representations of the improved motor showing successive stages in the operation thereof, as the motor is brought up to speed.

By referring to the drawings it may be noted that the blade 1 of the improved motor is made of sheet metal bent to the desired shape as best shown in Fig. 4, the free edges of the metal being fastened together by suitable means, such as rivets 2. The blade is supported by a shaft 3 which extends within the hollow portion of the blade and is secured thereto by any suitable means such as the rivets 4. The shaft 3 is mounted within a dome shaped casing 5, by means of low friction ball bearings 6. The blade 1 is counterbalanced by a weight 7 secured to the end of shaft 3 opposite the blade, the weight being fastened to the blade by the bolt 8 screwed into the end thereof. This weight 7, which comprises two parts disposed at some distance from the shaft 3 and on opposite sides thereof, is disposed at a definite angle with respect to the blade 1, and in addition to serving as a counterweight for this blade, it also serves as a means for limiting the speed of rotation of the blade in a manner hereinafter described. The angle made by the blade with the weight 7 may be approximately 90° as indicated in the drawings.

A second weight 9, comprising two counterbalancing parts, is journaled on the bearings 6 in such a manner that its center of gravity is substantially in line with the axis of rotation of the blade 1, which rotates about the vertical shaft 10 mounted in a suitable bearing 18. This weight 9 which is shown in the form of a thick disc is constrained by a spring 11 to assume a certain position when the motor is not operating. The spring 11 is secured to the base 12 which is mounted on the end of the shaft 10 and supports the bearings 6. The other end of the spring 11 is fastened to the disc 9 by any suitable means such as the lug 13. The weight 9 is fastened to the shaft 3 of the blade by a yielding connection shown in the form of a spring 14 welded or otherwise fixed to the weight at 16 and fixed to the shaft 3 at 15. Both weights 9 and 7 are disposed at an acute angle to the shaft 10, so that when the blade 1 rotates about the axis of this shaft, the centrifugal force on these weights tends to move them so as to increase the angles they make with this shaft.

The operation of the improved mill may be understood by referring to Figs. 5, 6 and 7. Fig. 5 shows the rest or starting position of the motor. It may be noted that the blade 1 is inclined at a comparatively small angle to the direction of the wind which is indicated by the arrow, and the weights 7 and 9 are disposed at an acute angle to the shaft 10. The blade 1 and weights 7 and 9 are held in the position shown in Fig. 5 by means of the spring 11 fastened to the weight 9. As the speed of the motor increases from starting to full speed, the positions of the several parts of the apparatus change until they assume the positions indicated in Fig. 6. In this figure it will be noted that the weight 9 has assumed a position nearer at right angles to the shaft 10 than it was at starting. The centrifugal force acting on this weight 9 caused it to assume this new position. As the weight 9 changed its position it changed the position of the blade 1 so as to gradually increase the angle that it makes with the wind until it finally assumes the position shown in Fig. 6, this movement of the weight 9 being transmitted to the blade 1 through the spring 14. It should also be noted that the weight 9, by its movement, has extended the spring 11. Further movement of the weight 9 is prevented by means of the stop 17 against which one side of the weight 9 abuts when the motor has reached full speed. It should be noted that the weight 7 has been moved into a position more nearly in line with the shaft 10 than it was at starting. Since the weight 7 is rigid with respect to the blade 1, it was, of course, moved with the blade when the latter was turned to its full speed position by the weight 9.

Fig. 7 shows the condition of the parts when the motor speed exceeds the full or normal value. When the motor speed exceeds the normal value the centrifugal force acting on the weight 7 gradually begins to take effect by returning the weight 7 to a position more nearly at right angles to the shaft 10. As the weight 7 turns the blade 1 is, of course, turned with it until it has assumed an angle which reduces the effect of the wind and slows the motor down. It should be noted that as the weight 7 turns to decrease the angle made by the blade with the wind, the weight 7 increases the tension in the spring 14. As the speed of the motor gradually slows down to the predetermined full or normal speed, the spring 14 gradually returns the weight 7 and the blade 1 to its normal full speed position.

From the preceding description it should be apparent that the improved motor is of such a character that the blade is inclined at the most efficient angle at all speeds from starting to full speed, and that means is provided for limiting the speed of the motor to a predetermined value. This new result is obtained by a novel arrangement of yielding connections, such as springs, and weights arranged so that the centrifugal force of these weights is utilized in changing the inclination of the blade.

The limiting angle of the blade 1 at full speed may be adjusted by adjusting the position of the stop 17 which is shown in the form of a bolt threaded to the support 12.

One of the novel features of this invention comprises means for clamping the support 12 onto the shaft 10. By referring to Fig. 1 it may be noted that the shaft 10 is tapered at one end thereof and the support 12 is adapted to fit on this tapered end of the shaft. The shaft is provided with keyways 19 which do not extend to the end of the shaft. The keys 20 which fit in these key-ways are provided with a bevel surface at the end opposite the end of the shaft. Stud bolts 21 are provided in the support 12 and extend at an angle to the shaft 10. These bolts 21 are adapted to engage the bevel ends of the keys 20. When these bolts are tightened the support 12 is clamped onto the end of the shaft. One particular advantage of this construction is that the support 12 and all the parts carried thereby may be positioned properly on the end of this shaft by adjusting the bolts 21. A nice adjustment is required in order that the rotating parts of the motor may be balanced properly. It may also be noted that this construction obviates the necessity of fastening the support 12 onto the shaft 10 by a nut or equivalent means secured to the end of the shaft.

It is to be understood that this invention is not confined to the particular embodiment shown and described but it is intended to include such modifications thereof as fall within the scope of the appended claims.

I claim:

1. A motor of the type described, comprising a blade adapted to be rotated by the wind, yielding means operating continuously upon said blade to hold it at a certain angle to the wind, a weight yieldingly connected to said blade for increasing its angle to the wind as the speed of the blade increases.

2. A motor of the type described comprising a blade adapted to be rotated by the wind, a weight yieldingly connected to the blade for increasing the angle of the blade to the wind as the speed of the blade increases, and yielding means connected to said weight and constantly tending to hold the blade at a relatively small angle to the wind.

3. A motor of the type described comprising a blade adapted to be rotated by the wind, a weight for increasing the angle of the blade to the wind as the speed of the blade increases, spring means connecting said weight to the blade and a spring connected to said weight and constantly tending to maintain the blade at a relatively small angle to the wind.

4. A motor of the type described comprising a blade adapted to be rotated by the wind, yielding means operating continuously upon said blade to hold it at a certain angle to the wind, a weight yieldingly connected to said blade for increasing the angle of the blade to the wind as the speed of the blade increases, and means for limiting the action of said weight when the speed of said blade has reached a predetermined value.

5. A motor of the type described, comprising a blade adapted to be rotated by the wind, a spring tending to hold said blade at a certain angle to the wind, a weight associated with said blade for increasing this angle as the speed of the blade increases, means for limiting the action of said weight when the speed of said blade has reached a predetermined value, and means for decreasing the angle made by the blade with the wind when the speed of the blade increases beyond this predetermined value.

6. A motor of the type described, comprising a blade adapted to be rotated by the wind, a shaft supporting said blade, a coil spring enclosing said shaft and having one end fastened thereto and a weight yieldingly connected to said blade and secured to the other end of said spring, said weight being arranged so that when the speed of rotation of said blade increases, the centrifugal force on said weight causes it to turn said blade and against the tension of said spring.

7. A motor of the type described, comprising a blade adapted to be rotated by the wind, a counterweight fixed to said blade, a second weight yieldingly connected to said blade, yielding means tending to hold said second weight in a predetermined position, and means for limiting the movement of said second weight when it is displaced from said predetermined position by the centrifugal force acting on said second weight, said counter weight being arranged at an acute angle to the shaft of said motor, and of such magnitude that it serves as a speed limiting device.

8. In a motor of the type described, a shaft having a tapered end, a blade support on the tapered end of said shaft, and clamping means for fixing said support on said shaft, said clamping means being inclined at an angle to said shaft and accessible from the bottom of said support.

9. In a motor of the type described, a shaft having a tapered end provided with keyways therein, a blade support on the tapered end of said shaft and clamping means inclined at an angle to said shaft and adapted to engage keys in the keyways of said shaft.

In testimony whereof I affix my signature.

JOHN ARCHIBALD PINAUD.